(12) United States Patent
Tchouangueu (10) Patent No.: US 9,995,330 B2
(45) Date of Patent: Jun. 12, 2018

(54) REMOTELY CONTROLLABLE FASTENING DEVICE (71) Applicant: Jacques Tchouangueu, Zurich (CH)

(72) Inventor: Jacques Tchouangueu, Zurich (CH)

( * ) Notice: Subject to any disclaimer, the term of this patent is extended or adjusted under 35 U.S.C. 154(b) by 98 days.

(21) Appl. No.: 14/763,578

(22) PCT Filed: Jan. 28, 2014

(86) PCT No.: PCT/IB2014/058612
§ 371 (c)(1),
(2) Date: Jul. 27, 2015

(87) PCT Pub. No.: WO2014/118702
PCT Pub. Date: Aug. 7, 2014

(65) Prior Publication Data
US 2015/0354615 A1 Dec. 10, 2015

(30) Foreign Application Priority Data

Jan. 29, 2013 (DE) .................... 20 2013 100 400 U (51) Int. Cl.
F16B 21/06 (2006.01)
F16B 5/02 (2006.01)
(Continued)

(52) U.S. Cl.
CPC .............. F16B 21/06 (2013.01); F16B 1/005 (2013.01); F16B 1/0057 (2013.01); F16B 5/02 (2013.01);
(Continued)

(58) Field of Classification Search
CPC ........ F16B 21/06; F16B 1/005; F16B 13/063; F16B 1/0057; F16B 19/109; F16B 5/02; Y10T 24/45482; A44C 5/2057
See application file for complete search history.

(56) References Cited

U.S. PATENT DOCUMENTS 1,169,693 A * 1/1916 Swedlund ................ A44C 5/22
24/574.1
7,640,639 B2 * 1/2010 de Bien ............... A01K 27/005
119/772
(Continued)

FOREIGN PATENT DOCUMENTS

DE 4214206 A1 4/1993
DE 19507065 A1 9/1996
(Continued)

Primary Examiner — Robert Sandy
Assistant Examiner — Rowland Do
(74) Attorney, Agent, or Firm — Wagenknecht IP Law Group PC (57) ABSTRACT A remotely controllable fastening device for the detachable connection of components has a longitudinal axis and at least one fastening body for insertion into a fastening base, wherein the fastening body has an anchor which is insertable into the fastening base, wherein, for the form-closing and/or frictional anchoring of the fastening device in the fastening base, the anchor is moveable in at least a first direction, and wherein, for the disengaging of the fastening device, the anchor is respectively moveable in a second direction which is contrary to the first direction, and wherein the anchor is connected with a drive which is remote operatable and which is provided for operation with a fluid and which is internally arranged, the anchor being moveable by the drive in at least the second direction.

6 Claims, 8 Drawing Sheets (51) Int. Cl.
  *F16B 19/10* (2006.01)
  *F16B 1/00* (2006.01)
  *F16B 13/06* (2006.01)

(52) U.S. Cl.
  CPC .......... *F16B 19/109* (2013.01); *F16B 13/063* (2013.01); *Y10T 24/45482* (2015.01)

(56) References Cited

U.S. PATENT DOCUMENTS

| | | |
|---|---|---|
| 2002/0071738 A1 | 6/2002 | Choate |
| 2005/0172462 A1 | 8/2005 | Rudduck et al. |
| 2006/0133912 A1 | 6/2006 | Commins |
| 2007/0286702 A1* | 12/2007 | Smith ................ F16B 37/0857 411/432 |
| 2012/0134764 A1* | 5/2012 | Smith ..................... F16B 39/32 411/267 |

FOREIGN PATENT DOCUMENTS

| | | |
|---|---|---|
| DE | 10313170 B3 | 8/2004 |
| DE | 102004004658 A1 | 9/2005 |
| EP | 0348740 A1 | 6/1989 |

\* cited by examiner

REMOTELY CONTROLLABLE FASTENING DEVICE

CROSS-REFERENCE TO RELATED APPLICATIONS

This application is a national phase entry under 35 U.S.C. § 371 of international application serial no. PCT/IB2014/058612, filed Jan. 28, 2014, which claims priority to German patent application serial no. DE 10 2013 100 400.6, filed Jan. 29, 2013; the content of each is herein incorporated by reference in its entirety.

TECHNICAL FIELD

The invention relates to the field of mounting technique. More particular, the invention relates to the field of detachable screw-like fastening devices.

BACKGROUND OF THE INVENTION

Fastening devices for the detachable connecting of objects are known for a long time in the form of bolted connections. Here, a first moveable (separately present) body presently called "fastening body" is connected to a suitable second body presently called "fastening base" by means of rotating relative motion. The second body can be movable (mobile) as well, or it can essentially be stationary (immobile).

The fastening device can have an outer thread (screw). The fastening base has then a suitable inner thread. It can also be moveable (nut) and thus exclusively serve for the fastening. It can however also be arranged within a further object or be part of the same (threaded hole), wherein the other object primarily fulfils other functions (e.g. car body, wall).

The fastening device can have an inner thread (nut). Then, the fastening base has a suitable outer thread. It can also be moveable (screw) and thus exclusively serve for the fastening. It can however also be attached to a further object or be part of the same (threaded bolt, stud bolt), wherein the further object primarily fulfils other functions (e.g. motor block).

A disadvantage of the known fastening devices is that, depending on the length of thread and thread pitch, they need a large number of rotations in order to eventually reach their end position (fastened state), or in order to be fully turned outwards from their counterpiece. For this, an according amount of time is necessary. If further the available space is limited, this time is additionally increased, since a user can turn the according tool (screwdriver, screw wrench) only in small angles, needing to re-apply it again and again.

For this, ratchet spanners and the like are known in the art which allow for a quicker fastening or detaching, or at least for avoiding the repeated applying. Also, driven tools are known. However, all these solutions require at least a single applying of the tool to the screw or nut in order to anchor the same in its fastening ground or to remove the same from it. If several fastening devices must be detached from their fastening bases, the time necessary for this multiplies accordingly.

An improved fastening device is e.g. known from document US 2002/0071738 A1. The same is held in a fastening base by means of mechanical shoulders which are retractable into the body of the fastening device. For detaching the fastening device, a special mechanical tool is necessary; by applying the same to the fastening device, the shoulders are pulled into the inside of the same, or they can be pushed inside, respectively, so that it can be removed from the fastening base.

A further disadvantage lies in the multitude of different engagement geometries (catch profiles). Known geometries are e.g. the slot or the cross recess, internal or external hexagon, or the so called "Torx" (hexalobular socket according to EN ISO 10664). Since connecting devices with different engagement geometries are often used on one component, an according number of different tools must be provided; otherwise, the components can not be assembled or disassembled. The aforementioned fastening device does as well need a tool which is specially provided therefore.

A common problem is the damage of the engagement geometries when screwing, but, at the latest, when unscrewing the fastening device from the fastening base, effected by too high screw-in forces. The usage of torque spanners which are known for a long time (e.g. document U.S. Pat. No. 2,159,354 from the year 1939) has not gained acceptance in all fields of technology, since such a spanner is once again a special tool.

For example, no tool is needed for detaching the fastening device disclosed in document DE 103 13 170 B3; here, loosening of the socket pin is effected by actuating a simple push button.

Also no tool, but electrical power is needed in order to detach the fastening devices shown in document DE 10 2004 004 658 A and US 2005/0172462 A1 from a fastening base. By means of the electrical power, components made of shape memory alloys or bimetal are heated, so that they deform in such a manner that loosening becomes possible.

Another possibility for the detaching of fastening devices is proposed in document DE 19507065 A1. Components which are stable in normal environmental conditions are dissolved by means of a fluid (e.g. water or water vapor), so that then, a pretensioned spring mechanism provides the actual detachment energy which results in a retraction of elements which are anchored form-closing in the fastening base. Also, a (reversible) displacement of the elements by means of mechanical coupling with swellable components is proposed.

The previously mentioned electrically actuatable fastening devices can only produce small forces, so that they can be used only in such situations where the forces necessary for detaching are small. The chemically actuatable fastening means have the disadvantage that they are either actuatable only once, or that they have at least very long switching times.

A further disadvantage lies in the known fact that after a certain time, once assembled connecting means can become hardly, or not at all, be detachable. This can e.g. be effected by slow-acting corrosion. This problem is addressed, with limited success, by means of according coatings.

Another problem comes up in particular when using groups of fastening devices which serve for the common connection of two or several components (e.g. wing of the vehicle, cover panel on a wall). The time which is necessary for detaching the components grows linear with the number of fastening devices, which for large numbers results in very long times. Known solutions with elastic anchors (e.g. plastic clips) do save time during fastening; however, they are so much harder, and not in parallel, to detach. One possibility for the decrease of the time necessary for detaching lies in the usage of electrically or fluidically actuatable fastening means (see above), wherein the limitation to cases of small detachment forces or slow switching times does still exist.

A solution which is also based on a fluidically actuatable drive is shown in document DE 4214206 A1. Here, a working cylinder which acts against disk springs is moved by means of a fluid (e.g. hydraulic oil), with a ball joint bolt being attached thereto in axial direction. The same presses in a resting position with a force which is determined by the disk springs against a rail which is to be fixed. For detaching, the working cylinder is pressurized, such that the bolt detaches from the rail, releasing it. Disadvantageous in this solution is the unchangeable clamping force which is determined by the disk springs, as well as the necessity of being able to build up a pressure by means of the working cylinder that must exceed the holding pressure of the disk springs.

SUMMARY OF THE INVENTION

The invention has the object of providing a fastening device which allows for a very quick detaching of the fastening device from the fastening base. Special tools shall not be necessary for this. The time which is necessary for detaching a multitude of fastening devices shall be short in comparison to common solutions. The fastening device shall be easily detachable even when the connecting forces (static friction between fastening device and fastening base) are very high. Further, also groups of fastening devices shall be connectable and/or detachable in a very short time.

The object is solved by a fastening device for detachable connection of components, with a longitudinal axis and at least one fastening body for insertion into a fastening base, wherein the fastening body has an anchor which is insertable into the fastening base, and wherein, for the form-closing and/or frictional anchoring of the fastening device in the fastening base, the anchor is moveable in at least a first direction, and wherein, for the disengaging of the fastening device, the anchor is respectively moveable in a second direction which is contrary to the first direction, and wherein the anchor is connected with a drive which is remotely operatable and which is provided for operation with a fluid and which is arranged within the fastening device, the anchor (3) being moveable by the drive (4) in at least the second direction (R2), and wherein the anchor (3) comprises at least two individual parts (3'), and wherein the respective first direction (R1) into which each of these individual parts (3') is moveable perpendicularly runs away from the longitudinal axis (L), and wherein each of these individual parts (3') has a shoulder (5) which runs perpendicular to the longitudinal axis (L), the shoulder (5) being able to form-closing cooperate with an undercut (6) of the fastening base (2). Further preferred embodiments can be taken from the description and the drawings.

For example, the drive can be arranged in a region between the anchor's individual parts inner sides which are facing the longitudinal axis, and wherein the drive is formed by springs which act onto these inner sides and which press the individual parts radially outwards, the springs being mechanically coupled to a cylinder which is moveably arranged in a pressure channel that runs along the longitudinal axis and that can be loaded with a fluid from the outside, so that the cylinder is displaceable upon pressurization from a resting position into a detaching position in which the springs which are coupled thereto are moved in the respective second direction. The same can have a head with a catch profile being accessibly arranged for a tool, the catch profile being mechanically coupled to the pressure channel or the cylinder, such that upon rotation and/or axial displacement of the catch profile, cylinder and pressure channel are rotated relative one to the other and/or are axially displaced one to the other, and the springs which are coupled to the cylinder are moved into the respective second direction. In some embodiments the same has a point which is arranged at the front end of the fastening body and which has a spring, the spring force of which being directed contrary to an insertion direction of the fastening device. In some embodiments, its multi part anchor includes friction reducers in the form of partially projecting rolls, balls, and/or wheels in its contact surfaces(s) with the fastening base.

The invention comprises two main types of fastening devices. At first, that features are described which both types have in common.

The remotely controllable fastening device according to the invention for the detachable connection of components has a longitudinal axis and at least one fastening body for insertion into a fastening base. As described above, the fastening base is provided for being detachably connected to the fastening device by at least partially receiving it within the fastening base.

For this, the fastening body has an anchor which is insertable into the fastening base, wherein the anchor is provided for the form-closing and/or frictional anchoring of the fastening device in the fastening base. For this, the anchor is moveable in at least a first direction. For the disengaging of the fastening device from the fastening base, the anchor is (respectively, if several first directions exist) moveable in a second direction which is contrary to this first direction.

Further, the anchor is connected, or at least connectable, with a drive which is remotely controllable and which is provided for operation with a fluid, the anchor being moveable by the drive in at least the second direction. The drive has the task of moving the anchor into at least the second direction (direction for detaching), where the anchor takes a position which allows to detach it—and thus, the fastening device—from the fastening base. Optionally, the drive can move the anchor also in the first direction which serves for the fastening.

According to the invention, the drive is a drive which can be driven by a fluid (also: which is driven by a fluid). This means that the drive is provided for operation with a fluid, i.e. a liquid, a gas, or a mixture thereof. Solids as well, i.e. small rubber beads, can be added to the fluid in order to increase the impulse. The remote operability is effected by switching on or off a remotely arranged pressure source.

Besides, the drive is internally arranged, i.e. within the fastening device. This has the advantage that the fastening device can replace a common screw or other fastening devices, without the need for more intensive constructive changes with regard to the component that is to be connected.

Further, the drive is suitable for moving the anchor in at least the second direction.

In the following, the features are described which characterize the first main type.

Accordingly, the anchor comprises at least two individual parts, and the respective first direction into which each of these individual parts is moveable perpendicularly runs away from the longitudinal axis.

Eventually, each of these individual parts has a shoulder which runs perpendicular to the longitudinal axis, the shoulder being able to form-closing cooperate with an undercut of the fastening base.

The second main type has the features "fastening body", "fastening base", "anchor", "movability of the anchor in at least a first direction", "detaching by moving in the second direction", "moving in the second direction by means of an internal, remote operatable drive which is provided for being operated with a fluid" in common. In order to avoid repetition, reference is made to the above explanations.

However, the first direction is a rotation around the longitudinal axis and the anchor is a cylinder with an outer thread which can cooperate form-closing with an inner thread in the fastening base. In other words, while the first main type has a linear acting drive, the second main type has a rotating acting drive which results in constructive differences. In particular, the features of the internal fluid drive have both types in common.

By using a fluidic drive which is assigned to the fastening device, detaching, and optionally fastening, of the fastening device can take place very fast. Special tools are not necessary, since the actuation takes place by loading the drive with pressure (typically, with over pressure). Since in the case of several fastening devices, the same can be commonly loaded with pressure, they are commonly actuated as well, so that even a large number of fastening devices according to the invention can be actuated in a short period of time. Since by means of the pressure, even high forces can be impinged onto the drive and thus, onto the anchor, the fastening device is detachable even if the connecting forces are very high.

BRIEF DESCRIPTION OF THE DRAWINGS

Subsequently, advantageous embodiments are discussed by way of examples and by aid of the figures, a brief overview of which is given in the following.

DETAILED DESCRIPTION OF PREFERRED EMBODIMENTS

Figure 1:
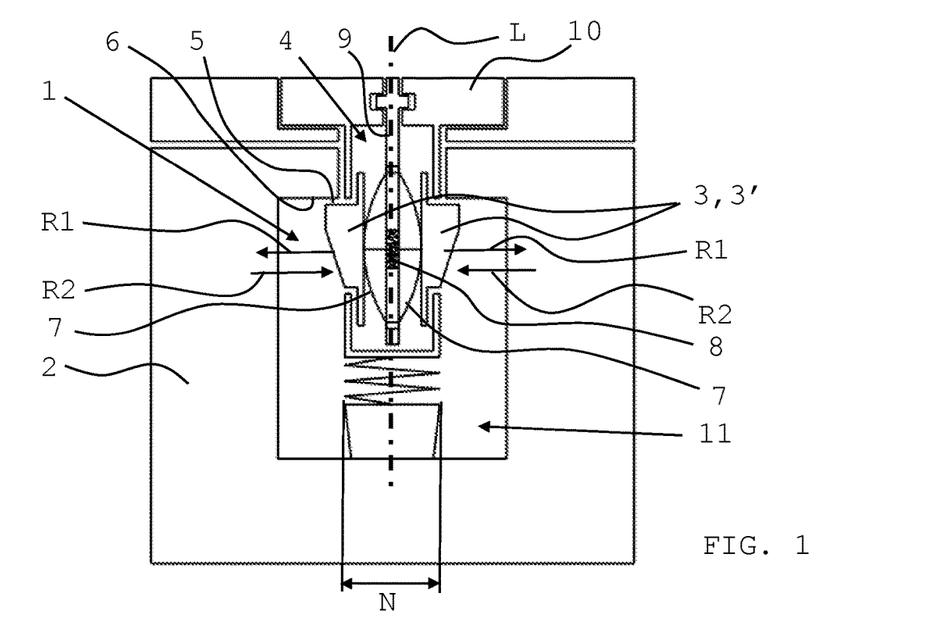
FIG. 1 shows an embodiment of the first main type of the fastening device according to the invention in a first position as a sectional view.

FIG. 1 shows an embodiment of the first main type of the fastening device according to the invention. The longitudinal axis L runs through it in vertical direction; it is at the same time the insertion direction. The fastening body 1 is inserted into a fastening base 2 which can be one component. The fastening body 1 has an anchor 3 which is multipart (individual parts 3'). In particular, the anchor 3 is designed to be insertable into the fastening base 2.

The anchor 3 is suitable for the form-closing and/or frictional anchoring of the fastening device in the fastening base 2. For this, it is movable in at least one first direction R1; presently, this are two first directions R1, since both individual parts 3' are movable radially outwards. For the disengaging of the anchor 3, the individual parts 3' are respectively moveable in a second direction R2 which is contrary to this first direction R1.

For this, the anchor 3 is connected with a remote operatable drive 4, the anchor being moveable by the drive in at least the second direction R2.

According to a not depicted embodiment, the drive is complemented by an electrical component (e.g. an electrically working fluid pump, a fluid cylinder which is driveable by means of bimetal or shape memory alloy). Thus, the remote operatability is effected in a simple way by the on and off switching of an electrical current. Preferred for this are in particular motor (rotating) drives. Although in general, electrical power is readily available, however, during longer standstill of the fastening device according to the invention, problems can arise with a purely electrical drive (corrosion). Further, the forces which can be generated by means of miniaturized electrical drives—in particular, without gearbox—can possibly be insufficient for detaching stuck fastening devices.

According to the embodiment shown in FIG. 1, the drive 4 is arranged inside the fastening device. This means that the fastening device comprises the drive 4 as an integrated internal component, and that the drive 4 is firmly attached to the fastening device, in particular, with the fastening body 1.

Also according to the embodiment shown in FIG. 1, the anchor 3 comprises at least two individual parts 3', and the respective first direction R1 into which each of these individual parts 3' is moveable perpendicularly runs away from the longitudinal axis L. In other words, the multipart anchor 3 can temporarily increase the circumference of the fastening device in a longitudinal section of the same.

According to this embodiment, each of these individual parts 3' has a shoulder 5 which runs perpendicular to the longitudinal axis L and which can (according to a not depicted embodiment) also be a bolt, the shoulder 5 which can (according to a not depicted embodiment) also be a borehole being able to form-closing cooperate with an undercut 6 of the fastening base 2. In other words, the anchor 3 has geometric features which cooperate in a first position (resting position, shown in FIG. 1) form-closing an/or frictionally with the fastening base 2, and which do not show this cooperation in a second position (detaching position, shown in FIG. 2), so that the fastening device is not anchored in the fastening base 2 any more.

Figure 2:
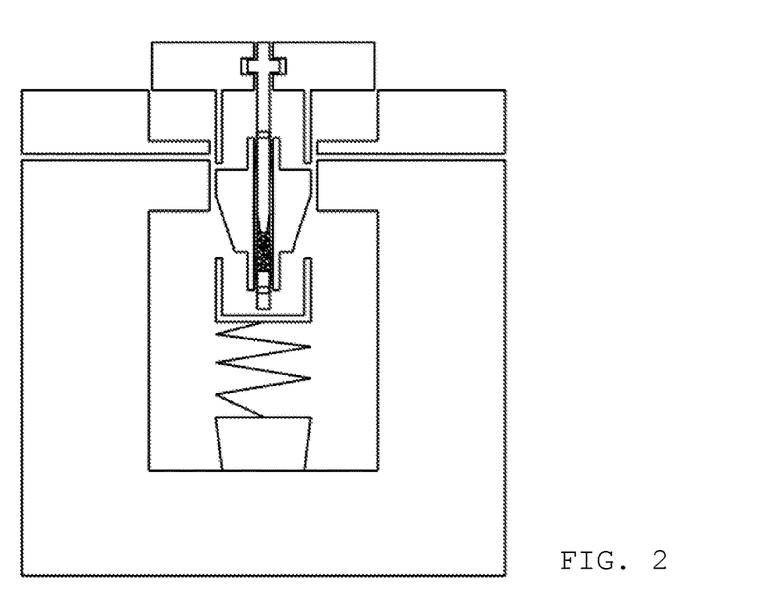
FIG. 2 shows the embodiment according to FIG. 1 in a second position.

In FIG. 2, reference numerals have been omitted for the sake of clarity. As can be seen, the individual parts 3' are retracted so far in direction of the longitudinal axis L such that the fastening body 1 can move out of the fastening base 2. The component which is shown at the top of the picture (no reference numeral) can now be detached from the component below which comprises the fastening base 2.

Advantageously, the individual parts 3' of the anchor 3 are designed at their outsides in such a way that they have a chamfer which is inclined such that that end of an individual part 3' which points in direction of the point 11 of the fastening device does not project in both positions over a "nominal diameter" N of the fastening device, whereas the other end of the individual part 3' does not project over this nominal diameter N only in the second position. Thus, this chamfer can work as an insertion aid, and upon inserting the fastening device, the individual parts 3' of the anchor 3 are automatically pressed in direction of the longitudinal axis (second direction), without a drive being mandatory for this.

In the aforementioned case, it is further preferred that the fluid operatable drive 4 is arranged in a region between the anchor's 3 individual parts 3' inner sides which are facing the longitudinal axis L, and that the drive 4 is formed by springs 7 which act onto these inner sides and which press the individual parts 3' radially outwards (away from the longitudinal axis L), the springs 7 being mechanically coupled, e.g. by means of wire ropes, chains, or cogwheels, to a cylinder 8. Thus, the drive is entirely contained within the interior of the fastening device.

Figures 3, 4:
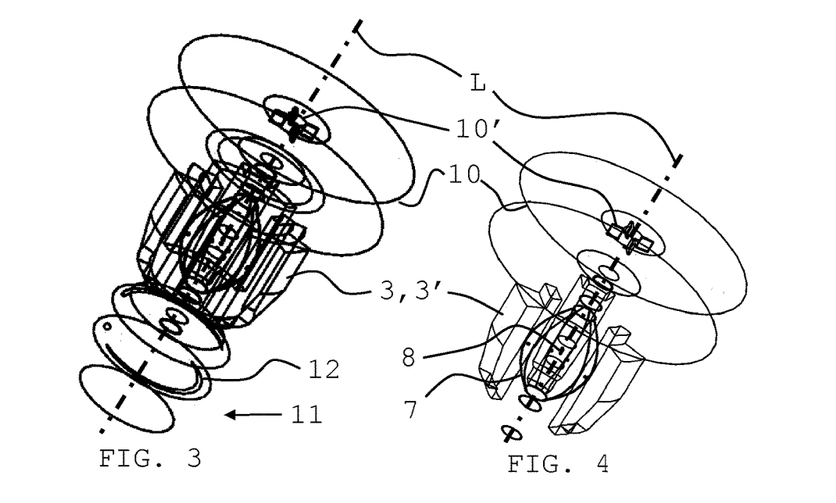
FIG. 3 shows the embodiment of the first main type of the fastening device according to the invention in a perspective wire-frame model view.
FIG. 4 shows details of the embodiment according to FIG. 3.

For this, reference is made to FIG. 3 and FIG. 4 where the details are more clearly visible. For the sake of clarity, there, the reference numerals are being used, if at all, then only once.

The cylinder 8, on his part, is moveably arranged in a pressure channel 9 that runs along the longitudinal axis and that can be loaded with a fluid from the outside, so that the cylinder 8 is displaceable upon pressurization from a resting position into a detaching position in which the springs 7 which are coupled thereto are moved in the respective second direction R2. If now the cylinder 8 is pressurized, it moves inside the pressure channel 9 and catches, by means of mechanics, the springs, such that these relieve the individual parts 3' of the anchor 3', and the anchor 3 moves from the resting in the detaching position. For this, it is advantageous if the inner sides of the anchor 3 are connected with the springs 7 for being able to be caught, or if (according to a not depicted embodiment) gravity or another restoring force is present by means of which the anchor 3 moves to the detaching position without being loaded by the springs 7.

In the not depicted case of an electrically supported drive it is preferred that the springs 7 are designed as bimetal and deform upon current flow, thus relieving the anchor 3, so that the fastening device is detachable.

In order for the fastening device according to the invention the be operatable not only by means of the fluidically operated drive 4, but also (in particular, detachable) by other, particularly by manual methods, the fastening means further comprises according to a preferred embodiment a head 10 with a catch profile 10' being accessibly arranged for a tool, the catch profile 10' being mechanically coupled to the cylinder 8 or to the pressure channel 9, as depicted in the first four figures. This can e.g. be achieved in that in the resting position, the cylinder 8 lies far at the head end of the fastening device, so that it can be reached from the outside through the pressure channel 9, and thus be moveable, or (e.g. because of an imprinted cross recess catch profile 10') rotatable. In the depicted embodiment, the catch profile 10' is arranged in the head 10 which turns into the pressure channel 9, so that the latter can be rotated from the outside by means of a common tool (cross recess screw driver, not shown).

As a result, upon rotation and/or axial displacement of the catch profile 10', cylinder 8 and pressure channel 9 are rotated relative one to the other and/or are axially displaced one to the other, and the springs 7 which are coupled to the cylinder 8 are moved into the respective second direction R2. Thus, the anchor 3 can reach the detaching position and the fastening device can be detached.

It is clear that an analog construction is possible for an electrically supported drive as well, without leaving the basis of the invention.

It is further preferred that the fastening device has a point 11 which is arranged at the front end of the fastening body 1 and which has a spring 12 (see FIG. 3), the spring force of which being directed contrary to an insertion direction of the fastening device (upwards in the picture). As soon as the anchor 3 is moved into the detaching position, the spring force drives the fastening body 1 out of the fastening base 2, so that, on one hand, a very simple optical control is possible whether a fastening device is connected or detached, and, on the other hand, the automatic detaching is further supported.

The driving in of such a fastening device of the first main type can e.g. be done with a hammer, while the detaching by means of a short fluid pulse leads to an immediate jump out of the fastening device.

It should be noted that this embodiment as well can be realized with an electrically supported drive.

Of course, the invention can be constructed such that the anchor is in the first position upon over pressure, and that it can move to the second position upon relieving this over pressure. As long as the fastening device is sufficiently fluid tight, it is possible to omit the provision of an over pressure, e.g. by means of an pressure tank or a compressor, which is otherwise necessary for detaching. It is also possible to control the motion of the anchor by means of under-instead of over pressure without leaving the basis of the invention.

Figures 5, 6:
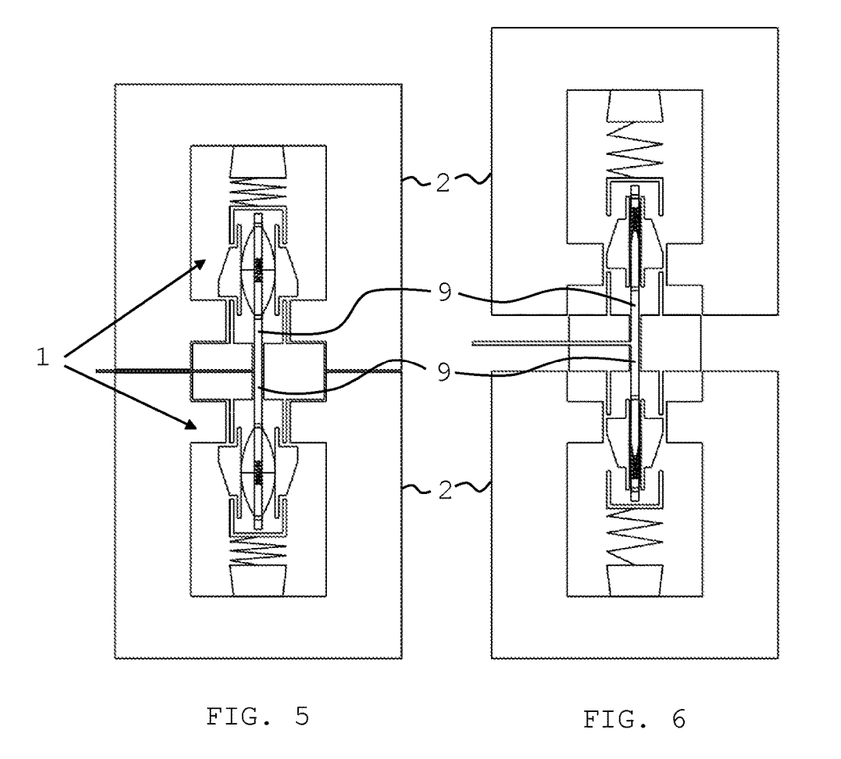
FIG. 5 shows a sectional side view on a variant of the embodiment according to FIG. 1 with two anchor ends in a first position.
FIG. 6 shows the embodiment according to FIG. 5 in a second position.

In FIG. 5 and FIG. 6, a variant of the above described embodiment of the first main type is shown, having two anchor ends and thus fastening bodies 1. On of these ends is anchored in a first fastening base 2, bottom of the picture, the other end in a second fastening base 2, top of the picture. In the left picture, the fastening device is in the resting position and attaches both fastening bases 2 with each other. In the right picture, the fastening device is depicted in a detaching position, both fastening bases 2 are distanced from each other. This is also supported by the both springs (reference numeral omitted). The pressure channels 9 of both sides of the fastening device are simultaneously loaded with fluid via a common fluid pipe, resulting in a remote controlled detaching of the fastening device.

Figure 7:
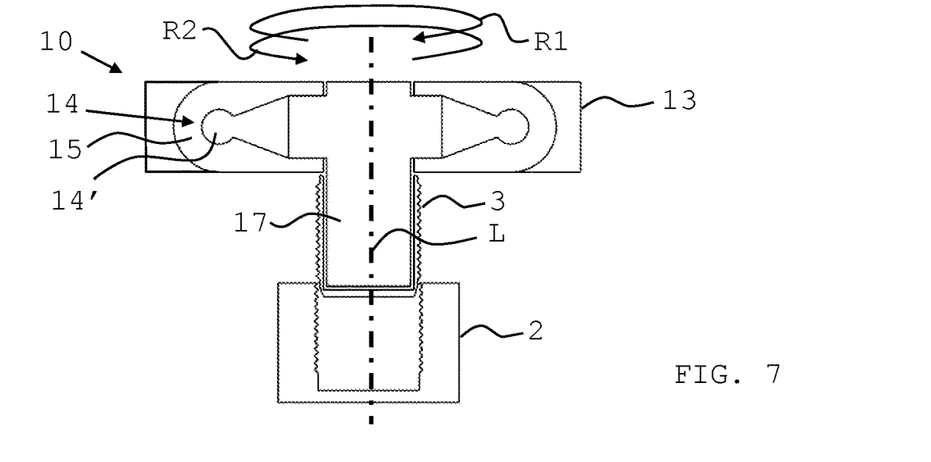
FIG. 7 shows an embodiment of the second main type of the fastening device according to the invention on a first position as a sectional view.
Figure 8:
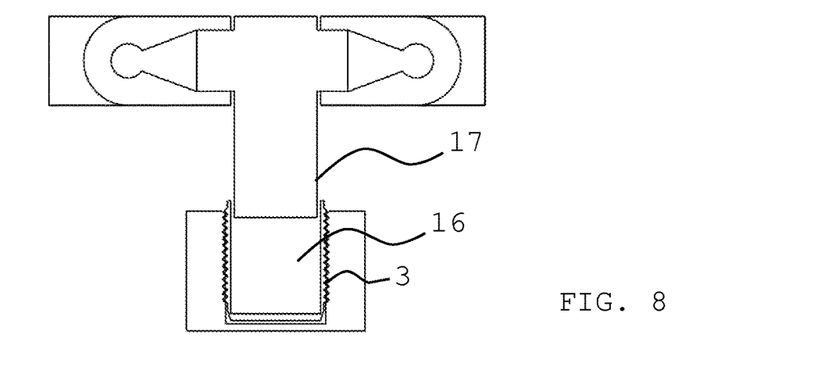
FIG. 8 shows the embodiment according to FIG. 7 in a second position.

In one embodiment of the second main type of the fastening device with a fluid operatable drive, shown in FIG. 7 and FIG. 8, the first direction R1 is a rotation around the longitudinal axis L and the anchor 3 is a cylinder with an outer thread which can cooperate form-closing with an inner thread in the fastening base 2. In other words, the first and the second direction R1, R2 do not run radial, but circular or helicoidal, and the anchor 3 is designed comparable with a thread piece of a common screw or a threaded bolt.

Then, the drive 4 is preferably arranged in a housing 13 which is located beyond that edge of the fastening device which comprises the anchor 3. Thus, in the case of a fastening device which reminds of a common screw, drive 3 is housed within the (screw) head 10, i.e. still internally.

Figure 9:
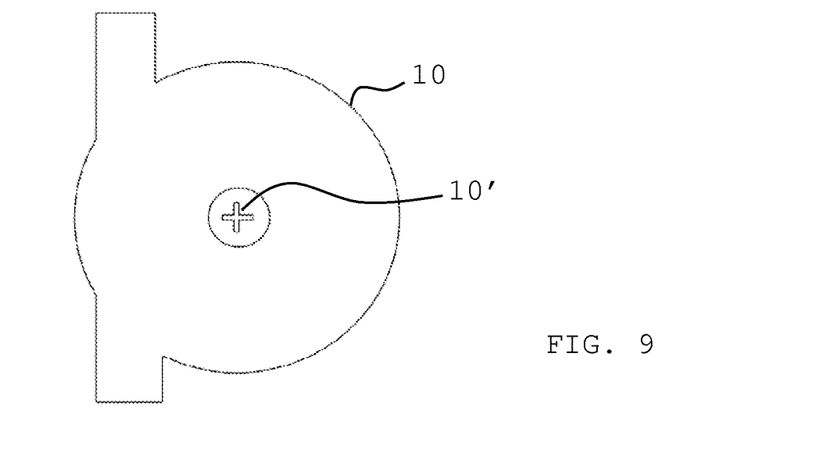
FIG. 9 shows a top view on the embodiment according to FIG. 7 and FIG. 8.

FIG. 9 shows a view from above/outside on the fastening device according to this embodiment. The line which runs vertical in the picture represents the inflow and the outflow (without reference numerals) for the fluid operated drive which is housed in the head (drive not depicted). However, the catch profile 10' is visible which is of the cross recess type in the shown embodiment. By rotating the same, the drive is being manually actuated, so that the fastening device is manually attachable/detachable in addition to the remote operatable service.

Figure 10:
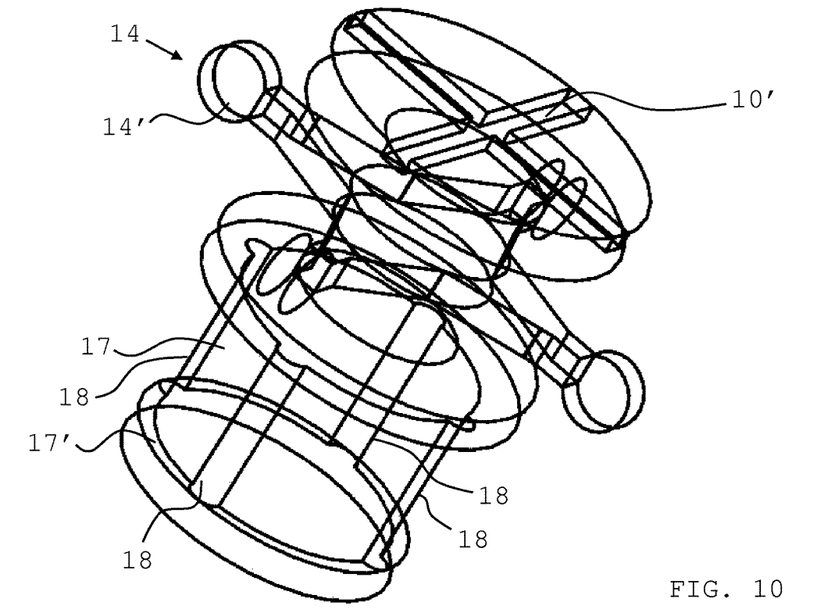
FIG. 10 shows a perspective view on components of the embodiment according to FIG. 7 to FIG. 9.
Figure 11:
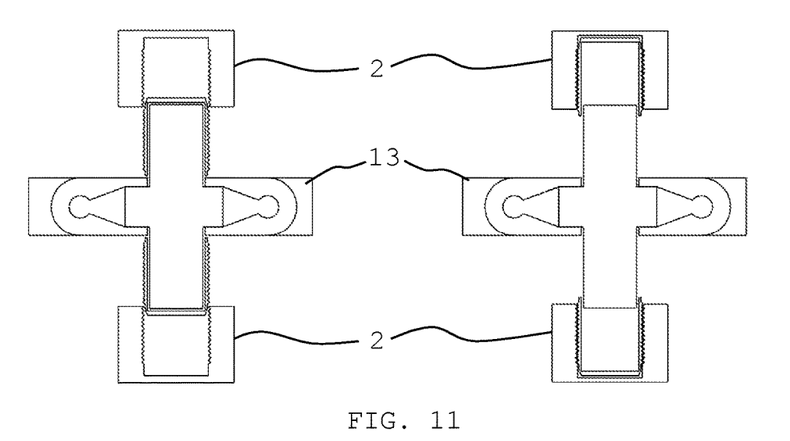
FIG. 11 shows two side views of different positions of a variant of the embodiment according to FIG. 7 with two anchor ends.

As can better be seen in FIG. 10 which shows details, the drive 4 is preferably formed by a rotor 14, the rotor blades 14' of which being arranged in a circular cavity 15 (see FIG. 7 and FIG. 8) that can be flown through by a fluid, wherein the rotor 14 is rotationally coupled to the anchor 3 (or the anchors, see FIG. 11). By rotation of the drive 4, the anchor 3 rotates together with the outer thread, the outer thread rotates and can screw itself into the fastening base 2 or out of the same, respectively. Since the rotation frequency of the fluidically driven rotor 14 can be high, an accordingly fast fastening and detaching is made possible.

According to a variant of the above mentioned second main type, the anchor 3 has a cavity 16 (see FIG. 8) and is arranged axially moveable on a pin 17 with catches 18 (see FIG. 10), the pin 17 being acceptable in this cavity 16 and firmly attached to the rotor 14. The catches 18 transmit the rotation of the rotor 14 and the pin 17 onto the anchor 3.

In order for the anchor 3 to not fall off the pin 17, and in order for being able to transmit axial forces, preferably, the anchor 3 has on its end which faces the drive an axial locking device against falling off from pin 17. This can e.g. be achieved by way of a tapering of the diameter at the opening of the anchor 3 (not shown), which cooperates with a shoulder 17' at the end of the pin 17 that can then not be overrun.

In the case of a fastening device comprising two anchor ends, the housing 13 which contains the drive 4 can also be arranged in the central part of the fastening device. This variant is shown in FIG. 11. Such a fastening device can advantageously connect two adjacently placed fastening bases 2 with each other.

Figure 12:
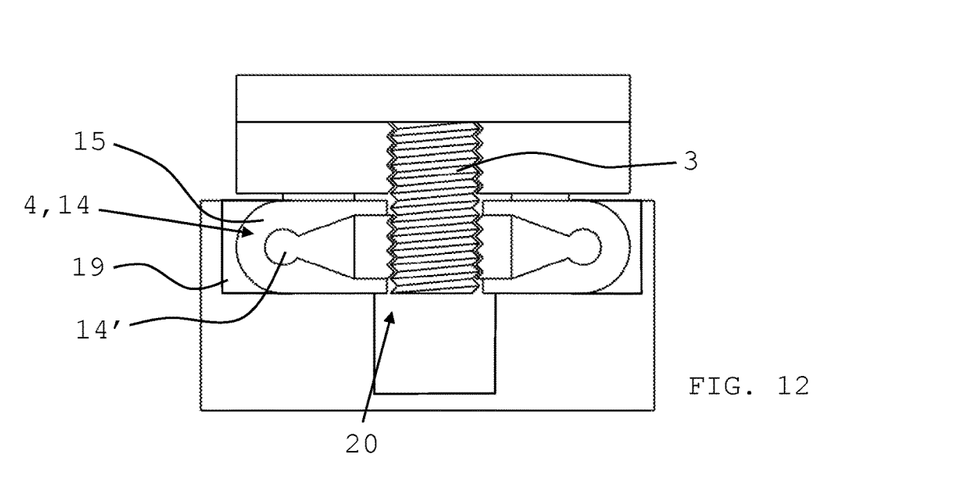
FIG. 12 shows another embodiment of the second main type of the fastening device according to the invention in a first position as a sectional view.
Figure 13:
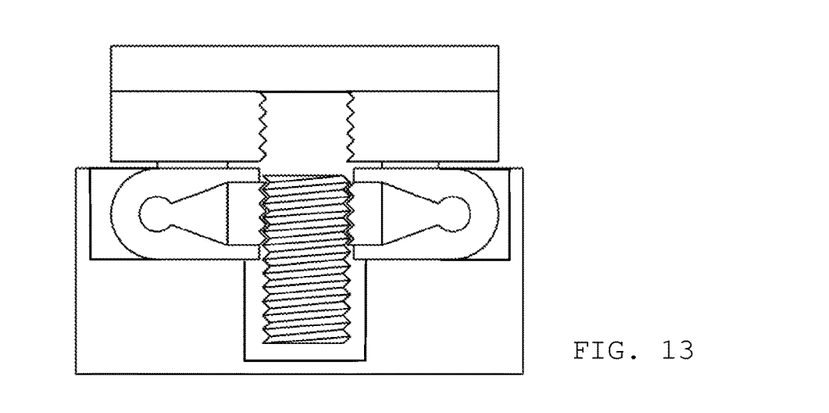
FIG. 13 shows the embodiment according to FIG. 12 in a second position.

According to another embodiment of the second main type of the fastening device according to the invention with a rotating drive which is shown in FIG. 12 and FIG. 13, the drive 4 is arranged in a housing 19 which is situated in a component that serves as an abutment (on the bottom of the picture, respectively, without reference numeral). Thus, the drive 4 is not arranged in a "head" or the like. However, it is once again formed by a rotor 14, the rotor blades 14' of which being arranged in a circular cavity 15 that can be flown through by a fluid. Further, the rotor 14 has an axial threaded hole 20 for accepting the anchor 3, wherein the anchor 3 is secured against rotation and/or rotationally coupled with the rotor 14 (not shown). It is clear that the securing and coupling may not be activated simultaneously, since otherwise, the anchor 3 could not move any more.

Such a construction is comparable with a nut which automatically rotates in a support. If the nut (the rotor 14) rotates, and if the threaded bolt (anchor 3) is held in place (securing against rotation), it moves axially out of the rotor 14 or into the same, depending on the rotation direction of the rotor 14. If the anchor 3 is rotationally coupled with the rotor 14, i.e. co-rotates with the latter, it can screw itself upon rotation into a counterpiece (top of the picture), which typically comprises a threaded hole for the anchor 3. According to the actual application, the possibility to secure or to couple may be relevant, or both described types can occur sequentially (secure against rotation until the anchor 3 catches with the counterpiece, then coupling with the rotor 14 so that it screws itself into the counterpiece.

The securing and coupling can preferably take place hydraulically or pneumatically. It can however also occur by adaption of the friction coefficients and rotation frequency.

Figure 14:
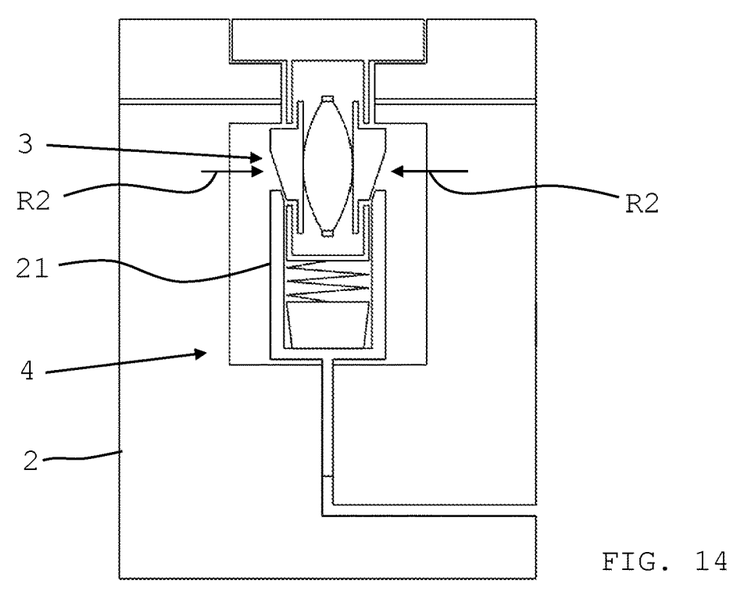
FIG. 14 shows another embodiment of the first main type of the fastening device according to the invention in a first position as a sectional view.
Figure 15:
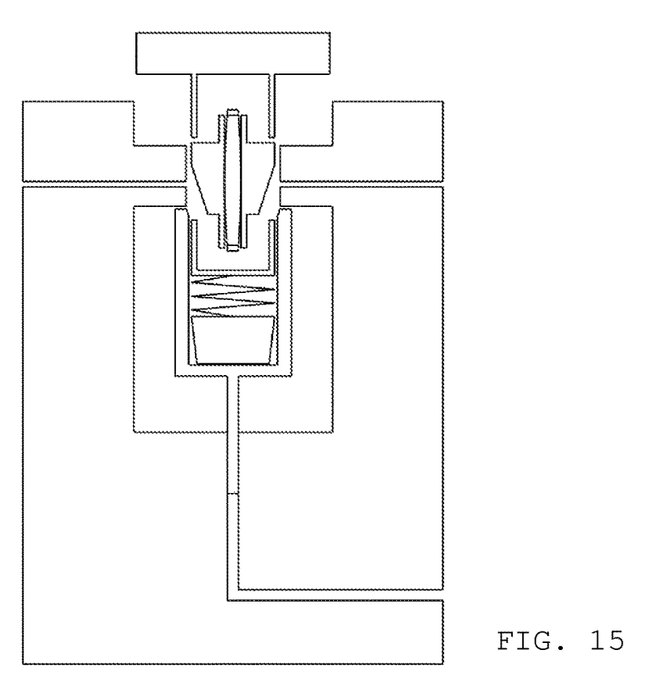
FIG. 15 shows the embodiment according to FIG. 14 in a second position.

According to another embodiment which is comparable with the first main type as described in the beginning, and in particular, with its anchor, depicted in FIG. 14 and FIG. 15, the fluid operatable drive 4 is arranged outside of the fastening device and comprises at least one mechanical component which is arranged moveably in the fastening base 2. The main difference is therefore the drive 4 which is not integrated in the fastening body, and which in addition comprises a component which is arranged in the fastening base 2. As for the other embodiment as well, the anchor 3 is moveable in the second direction R2 by means of the mechanical component, as shown in FIG. 15 where the reference numerals have been omitted.

Preferably, the mechanical component comprises a sleeve 21 suitable for accepting the front end of the fastening body 1, the sleeve 21 being axially displaceable from a first position (FIG. 14) to a second position (FIG. 15), and the anchor 3 being moveable by the sleeve 21 in the second direction R2. The sleeve 21 can, as depicted, be e.g. designed pot shaped, and it can have continuous or discontinuous (not shown) walls. The walls are dimensioned and arranged such that they act on the anchor 3 upon actuation of the drive 4, so that the anchor 3 is brought from the resting to the detaching position. Thus, the fastening device can be detached from the fastening base 2 by means of the (now external) fluidic drive 4. The drive 4 itself is integrated into the fastening base 2.

Figure 16:
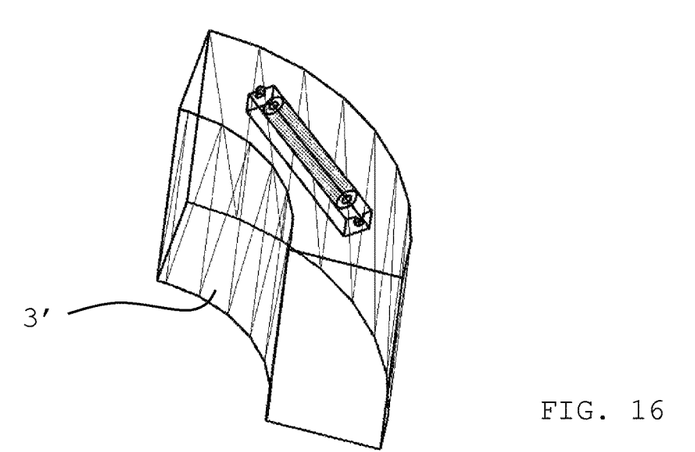
FIG. 16 shows a friction reducer in form of a roll.
Figure 17:
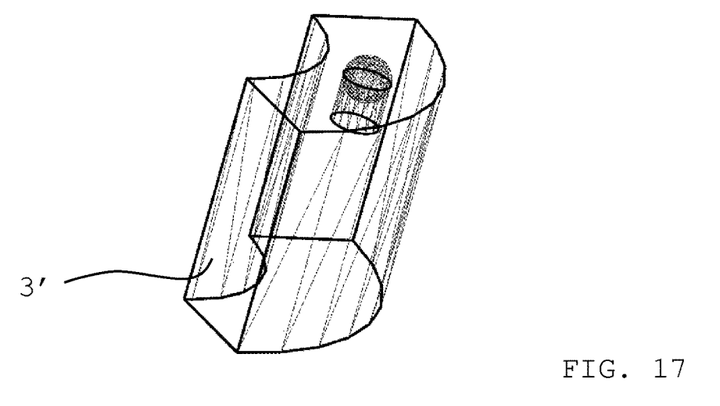
FIG. 17 shows a friction reducer in form of a ball.
Figure 18:
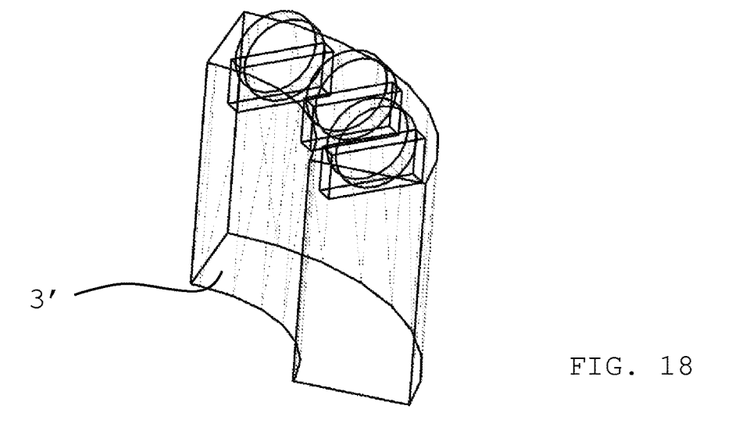
FIG. 18 shows a friction reducer in form of several wheels.

According to another embodiment which is particularly relevant with regard to variants with non rotatable anchor and which is depicted in FIG. 16 to FIG. 18, the multi part anchor 3, 3' comprises friction reducers in the form of partially projecting rolls (FIG. 16), balls (FIG. 17), and/or wheels (FIG. 18) in its contact surfaces(s) with the fastening base 2 (not depicted). In FIG. 1, these friction reducers that are not depicted there for the sake of clarity would be located in that side of the shoulders 5 which face upwards in the picture, and the contact surface would be located between this region and the undercut 6.

The purpose of these friction reducers is the decrease of the adhesive and dynamic friction between anchor 3 and fastening base 2, in order to retract the anchor 3 into the housing of the fastening device without a too high application of force. This is particularly advantageous because otherwise—in particular after a longer period of time—stuck fastening devices can be the result. This problem is known from common screws, and it is effectively avoided by means of the present friction reducers together with the anchor 3. Also when using an electrically supported drive, the decrease of friction is desirable, since such drives can typically not produce strong forces.

Eventually, the invention relates to a fastening system with a multitude of fastening means according to the above definitions, wherein their drives 4 are fluidically connected to each other, e.g. by means of interposed valves, and can be loaded with an over and/or under pressure.

This means that such a fastening device allows for the advantage of a massively parallel connecting or detaching of a multitude of fastening devices. Also, the switching of sub groups which can be selected by way of suitably interconnected supply pipes and/or valves is simply and quickly possible. For this, no tool is necessary; by means of a short fluid pulse, e.g. entire floors can be detached from tiles that were initially bolted therewith, or wall panels can be attached to walls.

Figure 19:
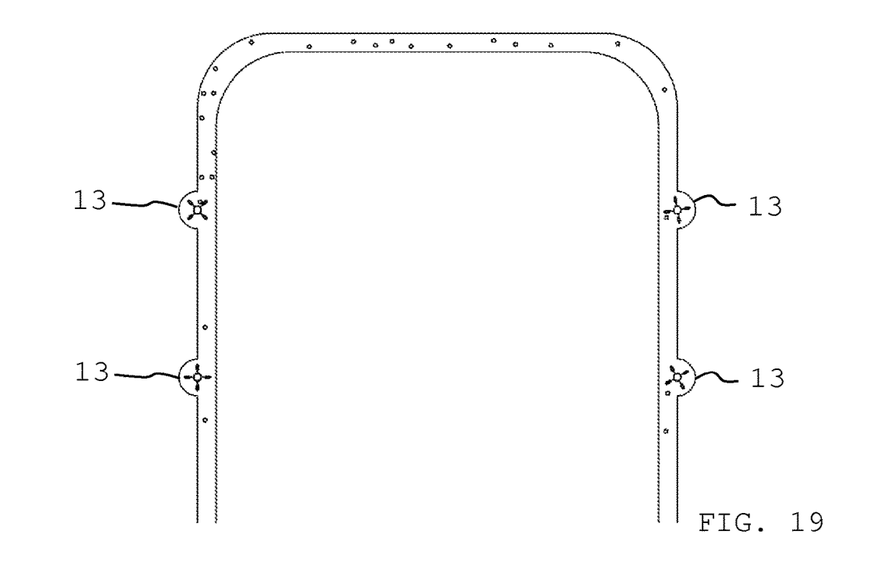
FIG. 19 schematically shows the fluidic interconnection of several drives.

In FIG. 19, schematically, a fluid pipe is depicted. The same feeds several housings 13 with rotors (reference numerals omitted) by means of a pressurized fluid that is enriched with rubber beads for increasing the impulse. Due to the flowing through, all rotors are simultaneously driven, so that the anchors which are connected therewith (not shown) are moveable. In this way, a massively parallel actuation of the fastening devices (not shown) is possible.

Figure 20:
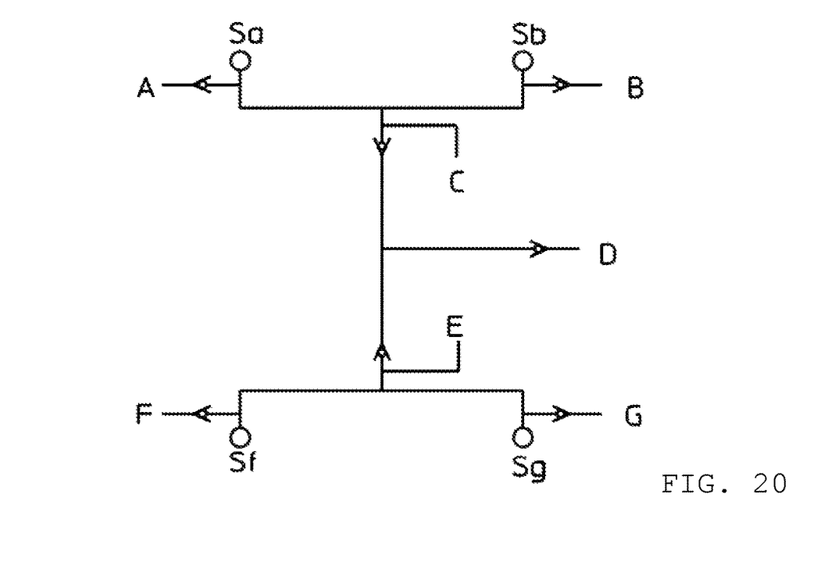
FIG. 20 shows an example for the grouped fluidic interconnection of several drives.

In FIG. 20, a schematic circuit diagram for a fluid operatable fastening system is shown. By a suitable arrangement of valves A, B, C, D, E, F, and G, groups can be formed which allow for an accordingly grouped control of the schematically depicted fastening devices Sa, Sb, Sf and Sg. In this way, the fluid (not shown) which is loaded with over- or under pressure can be introduced into the fastening system via one single port (presently D), without all fastening devices being simultaneously fastened or detached.

It is clear that the valves must be controllable, e.g. electrically or mechanically, by means of suitable measures.

It is clear that correspondingly, a fastening system with electrically supported drives is possible.

The above described invention solves, as shown, the problems which are known from the art, and provides remotely controllable fastening devices which can be fastened/detached quick and without tools, and which can be combined to a fastening system.

LIST OF REFERENCES 1 fastening body
2 fastening base
3 anchor
3' individual piece
4 drive
5 projection
6 undercut
7 springs
8 cylinder
9 pressure channel
10 head
10' catch profile
11 point
12 spring
13 housing
14 rotor
14' rotor blades
15 cavity
16 cavity
17 pin
17' shoulder
18 catch
19 housing
20 threaded hole
21 sleeve L longitudinal axis
R1 first direction
R2 second direction
N nominal diameter
A-G valve
S schematically depicted fastening device

What is claimed is:

1. A remotely controllable fastening device for detachable connection of components along a longitudinal axis (L), the fastening device comprising:
   a fastening body (1) having an anchor (3) configured for insertion into a fastening base (2), wherein the anchor (3) comprises individual parts (3'), each of which has a shoulder (5') that runs perpendicular to the longitudinal axis (L), further wherein the individual parts (3') are moveable in a first direction (R1) that is perpendicular to and away from the longitudinal axis (L) to form close the shoulder (5) with an undercut (6) of the fastening base (2) and/or to frictionally anchor the fastening device in the fastening base, and moveable in a second direction (R2) that is contrary to the first direction (R1) for disengaging the fastening device from the fastening base; and
   a remotely operable drive (4) arranged within the fastening device and configured to be driven by a fluid to move the individual parts (3') in the second direction (R2).

2. The fastening device according to claim 1, wherein the drive (4) is arranged in a region between inner sides of the individual parts (3') facing the longitudinal axis (L), and wherein the drive (4) is formed by springs (7) which press against the inner sides thereby pressing the individual parts (3') radially outwards, the springs (7) being mechanically coupled to a cylinder (8) which is moveably arranged in a pressure channel (9) that runs along the longitudinal axis (L) and that can be loaded with a fluid from the outside, so that the cylinder (8) is displaceable upon pressurization from a resting position into a detaching position in which the springs (7) which are coupled thereto are moved in the respective second direction (R2).

3. The fastening device according to claim 2, further comprising a head (10) with a catch profile (10') mechanically coupled to the pressure channel (9) or the cylinder (8), such that upon rotation and/or axial displacement of the catch profile, the cylinder (8) and the pressure channel (9) are rotated relative to one another and/or are axially displaced to one another, and the springs (7) are moved in the second direction (R2).

4. The fastening device according to claim 1, further comprising a point (11) which is arranged at a front end of the fastening body (1) and which has a spring (12), the spring force of which being directed opposite to an insertion direction of the fastening device.

5. The fastening device according to claim 1, wherein the anchor (3') comprises friction reducers in the form of partially projecting rolls, balls, and/or wheels in its contact surfaces(s) with the fastening base (2).

6. A fastening system with a multitude of fastening devices according to claim 1, wherein drives (4) between the fastening devices are fluidically connected to each other and can be loaded by a change in fluid pressure relative to ambient pressure.

* * * * *